United States Patent Office.

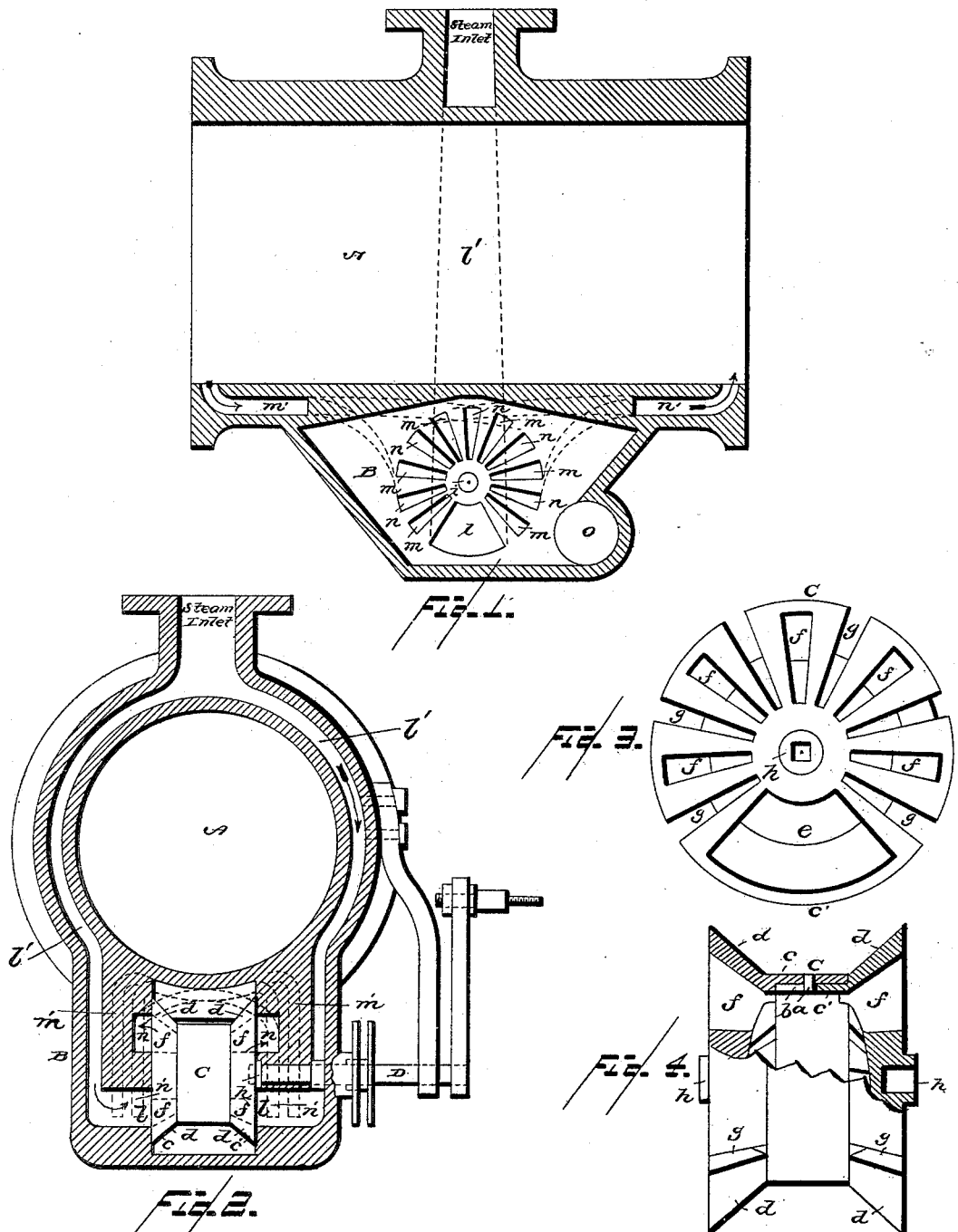

ADDISON B. CARLL, OF BRADFORD, PENNSYLVANIA.

BALANCED ROCKER-VALVE.

SPECIFICATION forming part of Letters Patent No. 339,265, dated April 6, 1886.

Application filed January 8, 1886. Serial No. 188,003. (No model.)

*To all whom it may concern:*

Be it known that I, ADDISON B. CARLL, a citizen of the United States, residing at Bradford, in the county of McKean and State of Pennsylvania, have invented a new and useful Improvement in Balanced Rocker-Valves, of which the following is a specification, reference being had to the accompanying drawings.

My invention relates to an improvement in balanced oscillating valves for steam-engines; and it consists in the peculiar construction and combination of devices that will be more fully set forth hereinafter, and particularly pointed out in the claims.

In the drawings, Figure 1 is a longitudinal sectional view of a portion of a steam-cylinder and a steam-chest with my improved valve removed. Fig. 2 is a vertical transverse sectional view of the same with the valve in position. Fig. 3 is an end elevation of the valve. Fig. 4 is a side elevation of the same, partly in section.

A represents a steam-cylinder, and B represents the steam-chest on the under side of the cylinder.

C represents a hollow cylindrical valve, which is formed of two sections, $c\ c'$, fitted together and extensible telescopically, one of the said sections having inwardly-projecting pins $a$, that enter and work in grooves or slots $b$ made in the other section. The ends of the valve are flanged, as at $d$, and beveled on their inner sides. The ends of the valve have the inlet-openings $e$ and the radial openings $f$, that communicate with the interior of the valve, and radial notches $g$ are cut through the flanges on the ends of the valve between the openings $f$. The valve is journaled in the steam-chest by means of trunnions $h$ on the ends of the valve, and recesses $i$ in the side walls of the steam-chest to receive them. The side walls of the steam-chest also have ports $l$, that correspond with the openings $e$ of the valve, and the series of alternately-arranged radial ports $m$ and $n$. The ports $m$ communicate with a channel, $m'$, that leads to one end of the cylinder and the ports $n$ communicate with a channel, $n'$, that leads to the other end of the cylinder. The ports $l$ communicate with channels $l'$ in the sides of the cylinder through which steam is admitted, and the steam-chest has an exhaust-port, one or more, $o$.

A valve-stem, D, is socketed at one end to one of the trunnions of the valve, and has a crank at its outer end, which is attached by a rod to an ordinary eccentric, with which the engine is provided, in the usual manner. It will thus be seen that the ends of the valve bear against the side walls of the steam-chest and is balanced therein by the pressure of the steam in and around the valve, which reduces friction thereon. The pressure of the steam on the inside of the valve keeps the ends of the valve tightly pressed against the side walls of the steam-chest.

The valve is oscillated slightly when the engine is in motion. When the openings $f$ in the valves register with the openings $m$ in the steam-chest, steam is admitted to one end of the cylinder, and the notches $g$ in the flanges of the valve register with the openings $n$, so as to exhaust the steam from the opposite end of the cylinder. When the valve is turned to cause the openings $f$ to register with the openings $n$, steam is admitted to the cylinder through the channels $n'$ and exhausted from the opposite end thereof, as will be very readily understood.

By this construction of the valve it is only necessary to oscillate the latter very slightly, thus reducing wear on the valve and valve-seat to a minimum, and effecting an economy in repairs for the engine by lengthening the life of the valve.

Having thus described my invention, I claim—

1. The combination, in a steam-engine, of the steam-chest having the radial openings $m$ $n$ in its side walls and arranged alternately and communicating with opposite ends of the cylinder, and an inlet and an exhaust port, with the cylindrical oscillating valve in the steam-chest having the radial openings $f$ to align alternately with the openings $m\ n$ and the radial notches or passages $g$ between the openings $f$, for the purpose set forth, substantially as described.

2. The combination, in a steam-engine, of the steam-chest having the radial alternate series of ports $m$ $n$ in its side walls and the oscillating cylindrical valve in the steam-chest having the radial openings $f$, to register alternately with the ports $m$ and $n$, and the end flanges having the radial passages or notches $g$ between the openings $f$, substantially as described.

In testimony that I claim the foregoing as my own I have hereto affixed my signature in presence of two witnesses.

ADDISON B. CARLL.

Witnesses:
GEO. A. STURGEON,
GEORGE H. BELLOWS.